United States Patent [19]

Majima et al.

[11] Patent Number: 4,908,711
[45] Date of Patent: Mar. 13, 1990

[54] ELECTRONIC WRITING BOARD

[75] Inventors: Osamu Majima; Koichiro Kakinuma; Tohru Naganuma; Makoto Ando, all of Tokyo, Japan

[73] Assignee: Sony Corporation, Tokyo, Japan

[21] Appl. No.: 201,167

[22] Filed: Jun. 2, 1988

[30] Foreign Application Priority Data

Jun. 24, 1987 [JP] Japan .................. 62-157176
Feb. 26, 1988 [JP] Japan .................. 63-43361

[51] Int. Cl.$^4$ .......................... H04N 1/23; G01D 9/00
[52] U.S. Cl. ........................ 358/296; 358/474 WD; 358/293; 358/300; 358/494 WD; 346/135.1; 346/153.1
[58] Field of Search ............... 358/285, 293, 296, 300; 346/135.1, 153.1

[56] References Cited

U.S. PATENT DOCUMENTS 4,241,134 12/1980 Burwasser ...................... 428/331
4,279,961 7/1981 Fujioka et al. ................. 428/328
4,713,698 12/1987 Takahashi ....................... 358/296

FOREIGN PATENT DOCUMENTS 0145463 6/1985 European Pat. Off.
1012795 5/1962 United Kingdom.
1363563 8/1974 United Kingdom.
1412422 11/1975 United Kingdom.
2025264 1/1980 United Kingdom.
2031757 4/1980 United Kingdom.
2064373 6/1981 United Kingdom.
2103514 2/1983 United Kingdom.
2166370 5/1986 United Kingdom.
2179272 3/1987 United Kingdom.
2190019 11/1987 United Kingdom.

Primary Examiner—C. L. Albritton
Assistant Examiner—Scott A. Rogers
Attorney, Agent, or Firm—Hill, Van Santen, Steadman & Simpson

[57] ABSTRACT

A flexible electrostatic recording medium used in conjunction with an electronic blackboard includes a base layer composed of a synthetic resin, a conductive layer formed on the base layer, and a dielectric layer formed on the conductive layer by a thin transparent film, preferably of polyvinylidene fluoride, and adhered to the conductive layer by means of an adhesive.

17 Claims, 5 Drawing Sheets

ELECTRONIC WRITING BOARD

BACKGROUND OF THE INVENTION

1. Field of the Invention

The present invention relates to a flexible electrostatic recording medium which is used in a display device referred to as an electronic blackboard in which a toner converts a latent electrostatic image formed on a substrate int a visible image.

DESCRIPTION OF THE PRIOR ART

Electronic blackboards providing a hard copy function from material written on a blackboard type substrate have been used for presentation purposes at meetings. In such apparatus, once the written contents of the blackboard have been erased from a display portion, if it becomes necessary to display the writing again, the material must be rewritten by hand. In view of this, it has been desirable to provide an electronic blackboard which is capable of re-displaying an original document on the electronic blackboard.

Japanese Patent Application (non-examined) sho No. 61-233597 published on Oct. 17, 1986 describes a display type of an electronic blackboard in which a manuscript reader, thermal head, and ink film are installed on the electronic blackboard, the ink on the film being thermally transcribed onto a blackboard sheet. However, the thermal transcript type of electronic blackboard disclosed in this Japanese application has several difficulties. First, the "write" speed is slow due to the thermal transcription, leading to an inconvenience such as interruption of the meeting, and its applications are limited. Second, the size of the apparatus is large due to the use of the thermal head and the large, elongated thermally sensitive ink film. Third, the number of writable screens per volume of the thermally sensitive ink film is limited and the operation of exchanging an ink film is difficult due to the length of the film. Fourth, the ink used in the thermal transcript is firmly attached to the blackboard sheet so that it is difficult to wipe it off. The correction of the written contents is therefore difficult.

SUMMARY OF THE INVENTION

The present invention provides a new electronic blackboard apparatus and electrostatic recording medium which are easy to operate and whose writing speed is fast.

The present invention provides a flexible electrostatic recording medium which includes a base layer of a synthetic resin, a conductive layer formed on the base layer, and a dielectric layer formed over the conductive layer and secured thereto. With this type of display sheet, we provided a white display sheet for an electronic blackboard on which legible handwritten letters can be produced and which is suitable for use as an electrostatic recording medium.

The apparatus provided by the present invention includes a flexible sheet which is movably supported by means of sheet guides, a recording head which contacts the surface of the sheet, and a developing device for making a visible image on the surface based on a latent image formed on the surface of the sheet by the recording head. The sheet comprises a base layer of synthetic material, a conductive layer formed on the base layer and a dielectric layer formed over the conductive layer.

The complete apparatus of the present invention provides an electronic blackboard having document display functions, comprising a first image reader for reading a document image and for generating document image signals therefrom, a flexible and handwritable blackboard sheet which is movably supported by sheet guides, a second image rader for reading a blackboard image handwritten on a surface of the blackboard sheet and for generating blackboard image signals therefrom, a recording head for recording an electrostatic latent image on the surface of the blackboard sheet from the document image signals, a developing device for forming a visible image of the latent image on the surface of the blackboard sheet, and a printing device for making printed documents from the blackboard image signals.

DESCRIPTION OF THE PREFERRED EMBODIMENTS

Reference will now be made to the attached drawings in order to facilitate understanding of the invention.

An electronic blackboard having a display function according to the present invention includes an endless belt of electrostatic recording medium 1 disposed to enable endless movement by means of a feed motor 2 and a driving roller 3 which engages the recording medium 1.

Figure 3:
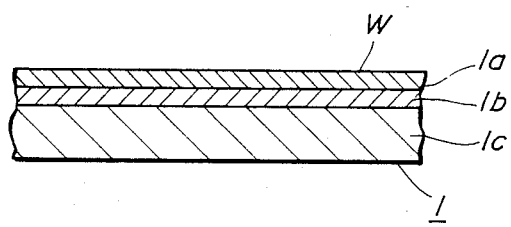
FIG. 3 is a cross-sectional view of an electrostatic recording medium according to the present invention.

As shown in FIG. 3, the electrostatic recording medium 1 includes a transparent dielectric film 1a made of polyvinylidene fluoride, a conductive film 1b formed of a substrate composed of a material such as a polyurethane resin, and a reinforcement sheet 1c such as a polyvinyl chloride. These various layers are laminated or adhered together. The polyvinyidene fluoride which constitutes the dielectric film 1a becomes chargeable at a low voltage as the dielectricity increases. Therefore, it is preferably not colored but is transparent and as thin as possible. A conductive material such as zinc oxide or titanium oxide or the like is preferably added to the polyurethane constituting the conductive film 1b. It is preferable to mix the polyurethane with titanium oxide which functions as a pigment to make it white The conductive film layer can be omitted if the reinforcement sheet $1c$ is conductive. Polyethylene terephthalate may also be used as the material for the dielectric film $1a$.

Figure 2:
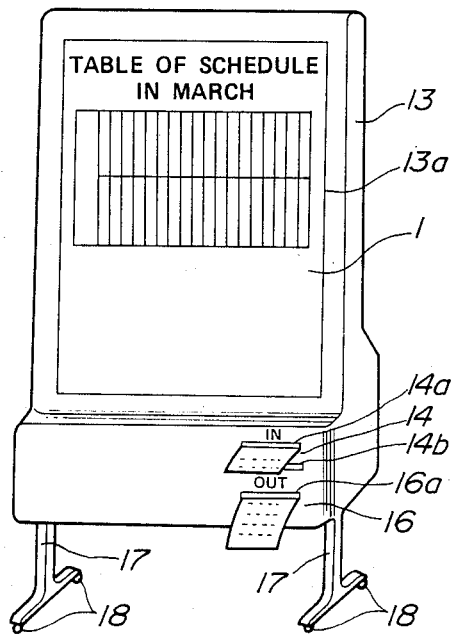
FIG. 2 is a view in perspective of the electronic blackboard apparatus according to the present invention.

FIG. 2 illustrates the outer appearance of the electronic blackboard. The blackboard is covered with a cover 13. The electrostatic recording medium 1 is exposed through a window portion $13a$ at a front surface of the cover 13 and functions as a writing board. A lower portion of the front surface of the cover 13 is provided with an inserting inlet $14a$ of a manuscript paper for an image reader 14, together with an exhaust outlet $14b$ and a discharge outlet $16a$ for issuing the printed papers from a printer portion 16. Furthermore, a leg portion 17 to which casters 18 are attached extends from a lower end of the cover 13 so that the electronic blackboard can be easily moved.

Figure 1:
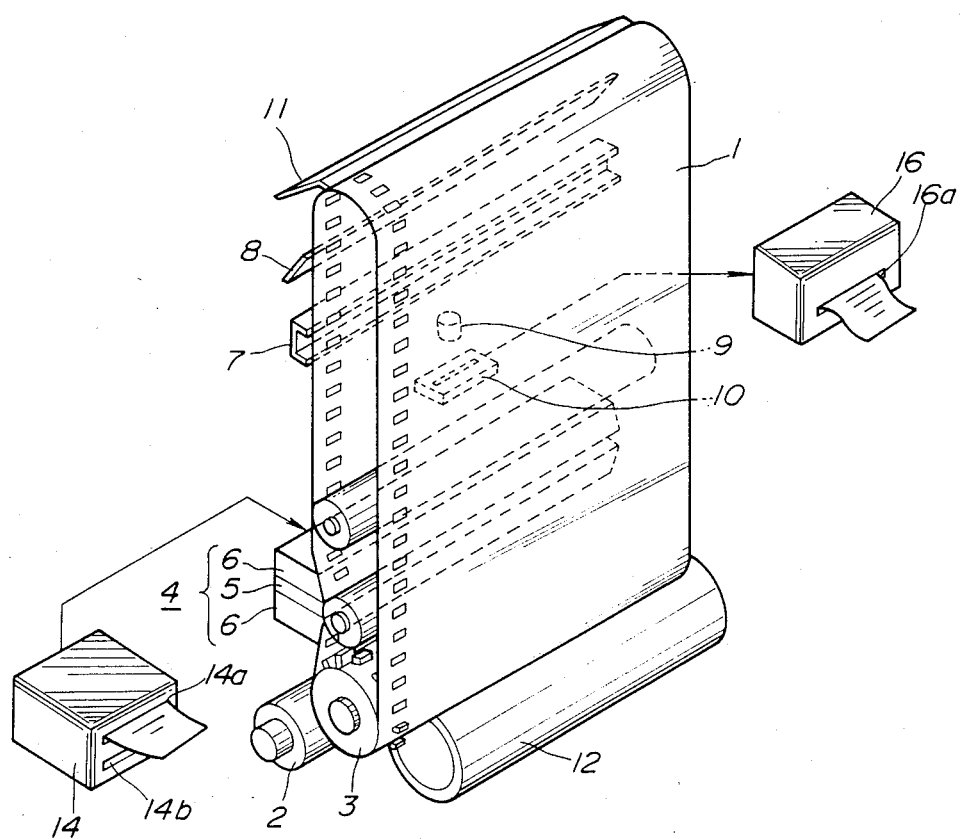
FIG. 1 is a schematic view in perspective to explain an electronic blackboard apparatus according to the present invention.

With the blackboard shown in FIG. 2, a felt pen is used to write letters or other indicia on the surface W of the recording medium 1. When the written contents thereof are copied, the recording medium 1 is advanced and information written on the recording medium 1 is read by means of a CCD sensor 10 by means of a reflecting mirror 11 located at the rear side of the apparatus as shown in FIG. 1. Next, the read information is copied on recording paper by means of a xerography method, for example, and is obtained from the discharge outlet $16a$.

Next, when a recorded image is displayed by the electrostatic recording method, the data read by means of an image reader portion 14 writes the electrostatic latent image on the surface W of the recording medium by means of the recording head 4. Midway through the transport f the recording medium 1, a black toner derived from a developer is applied to the charged portions so that the a visible image is produced. It should be noted that the ink or other matter on the display sheet is easily peeled off the surface by means of a cleaning blade 8 and thereafter the electric charge is eliminated by means of an A de-electrifier 7.

The recording operation of the electrostatic latent image will be described below.

Figure 6:
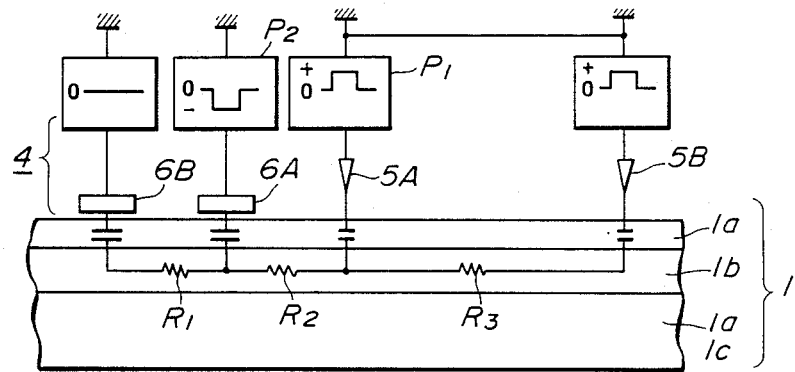
FIG. 6 is a diagram for explaining the theory of recording.

Referring to FIGS. 1 and 6, at the area where the recording head 4 contacts the sheet 1 the recording head comprises an electrode stylus portion 5. The stylus electrode portion 5 comprises a plurality of electrodes 5A, 5B, and so on. Adjacent the stylus electrode portion 5 are control electrode portions 6 comprising electrodes 6A, 6B, and so on.

Figure 4:
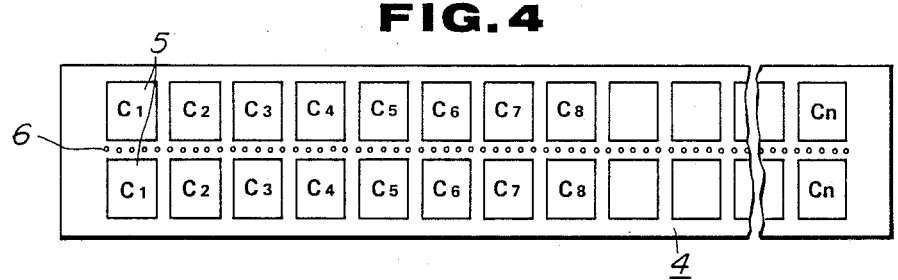
FIG. 4 is a diagramatic front view of a recording head.
Figure 5:
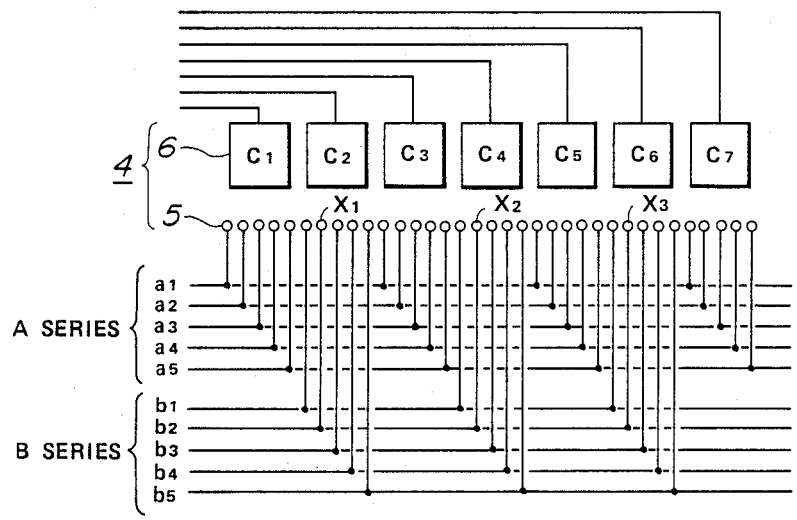
FIG. 5 is a connection diagram of a record matrix circuit for driving a record head.

In a contacting portion between the recording head 4 and the recording medium 1 an equivalent circuit as shown in FIG. 6 is formed between an electrode 5A of the stylus electrode portion 5 to which a selected write pulse, e.g., a positive voltage pulse $P_1$ is applied and a predetermined electrode 6A of the control electrode portion 6 to which a negative voltage pulse $P_2$ is applied by means of the dielectric $1a$ of the recording medium and the electrically conductive layer $1b$ of the recording medium 1. The discharge occurs between the stylus electrode 5A and the dielectric layer $1a$ which causes a gaseous ion to attach to the dielectric layer $1a$. The charge is formed on the dielectric $1a$ by means of the stylus electrode 5A. The recording head 4 consists of a multi-head structure having a plurality of stylus electrodes 5A, 5B, and so on arranged in a line as shown in FIG. 4 and a plurality of control electrodes $C_1$, $C_2$, $C_3$, ... $C_n$ is arranged so as to correspond to the electrode groups composed of a plurality of stylus electrodes to as to cover the stylus electrodes 5A from both sides. The recording head 4 is driven by means of a record matrix circuit shown in FIG. 5. Five stylus electrodes corresponding to each control electrode $C_1$, $C_2$, $C_3$, ... $C_n$ comprise one electrode group and the plurality of electrode groups are divided into two sets of series, i.e., an A series and a B series so that every other group belonging to the same series is set. The stylus electrodes corresponding to each series are mutually interconnected to derive terminal $A_1$ to $A_5$ and terminals $B_1$ to $B_5$. Independent write voltages are applied to the respective terminals $A_1$ to $A_5$ and $B_1$ to $B_5$. An independent selection voltage is applied to each control electrode $C_1$ to $C_7$. Hence in the case where a charge is formed at a point $x_1$, terminal $b_2$ of the B series is selected at the stylus electrode side and the positive voltage pulse $P_1$ is applied to the terminal $b_2$ and a negative pulse $P_2$ is applied to the control electrode $C_4$. Since in this case the stylus electrodes in the same series and connected to the terminal $B_2$ are all turned on, the positive voltage pulse $P_1$ is applied to the stylus electrode at point $x_2$ and the point $x_3$ of FIG. 5 so that a so-called half-selection state results. The positive and negative voltage pulses $P_1$ and $P_2$ are not discharged by the electrodes in such a half-selection state and are discharged only by the electrode which is in a full-selection state, i.e., that at a point $x_1$.

The formation of the electrostatic latent image by means for the recording head 4 will be described below.

Figure 7:
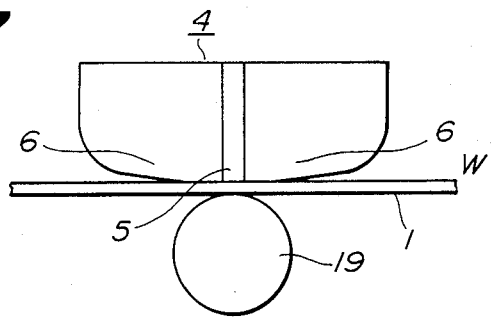
FIG. 7 is a diagram showing the positional relationship between the record head and the electrostatic recording medium.

As shown in FIG. 7, the central stylus electrode portion 5 of the recording head 4 requires contact of the central stylus electrode portion 5 with the write surface W of the electrostatic recording medium 1. A roller 19 made of a soft material such as sponge rubber is installed at a position opposing the stylus electrode portion 5 contacting the recording medium 1 so that the write surface W is brought into contact with the recording head 4.

Figure 8:
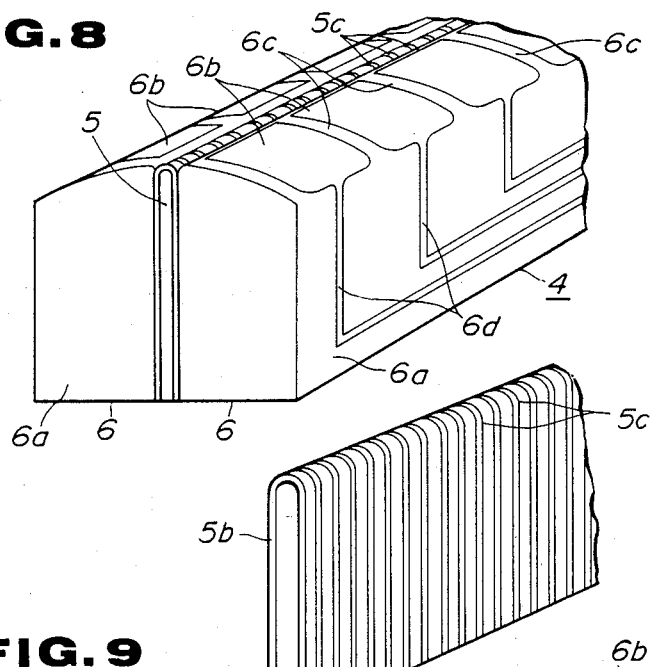
FIG. 8 is a perspective view of one example of the record head used in the present invention.
Figure 9:
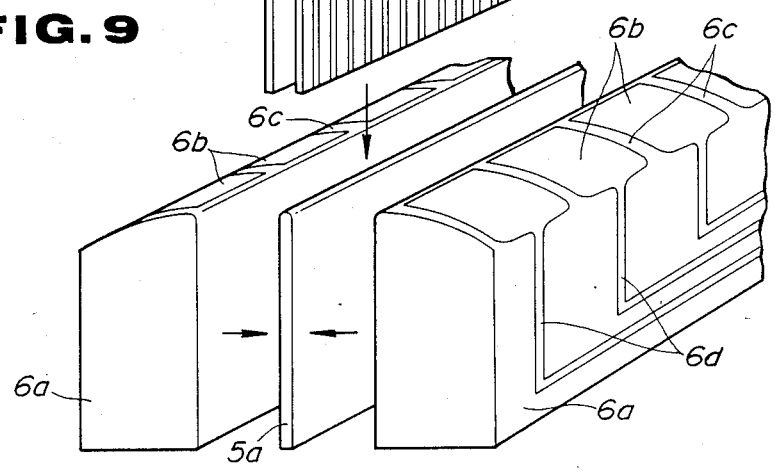
FIG. 9 is an exploded view of the record head shown in FIG. 8.

The recording head 4 includes the stylus electrode portion 5 consisting of a U-shaped flexible substrate $5b$ on which a plurality of parallel conductive portions $5c$ constituting electrodes are disposed on a thin plate $5a$ such as glass, as shown in FIGS. 8 and 9. Each conductive portion $5c$ is connected to a control circuit (not shown) of the recording head 4. A pair of control electrode portions 6 are disposed as to confine the stylus electrode portion 5. Stainless steel plates $6b$ of predetermined width constituting the control electrodes are adhered at predetermined paced intervals on to the upper surface of a base $6a$ constituted of an acrylonitrile-butadine-styrene resin. Silicon $6c$ is used to fill the space between the stainless steel plates $6b$. A conductive wireleads from each stainless steel plate $6d$ and is connected to the control circuit of the recording head 4.

In this system, the electrically conductive portion $5c$ exposed on the upper portion of the stylus electrode portion 5 serves as the stylus electrode and the stainless steel plates $6b$ at both sides thereof serve as the control electrodes.

Since the conductive portion $5c$ of the stylus electrode of the recording head 4 and the stainless steel plates $6b$ which is a control electrode in the vicinity of the conductive portion $5c$ are contacted by the write surface W of the electrostatic recording medium 1, an electric charge corresponding to an electrical potential difference between the conductive portion $5c$ and the stainless steel plate $5b$ is stored in the dielectric layer $1a$ of the electrostatic recording medium 1 and the amount of electric charge causes the electrostatic laten image.

The portion of the recording medium 1 in which the electrostatic latent image is formed is moved over a developer 12 by which, according to the amount of electric charge, a toner is deposited and adhered on the write surface W. Thus an image can be written and displayed on the recording medium 1.

Figure 10:
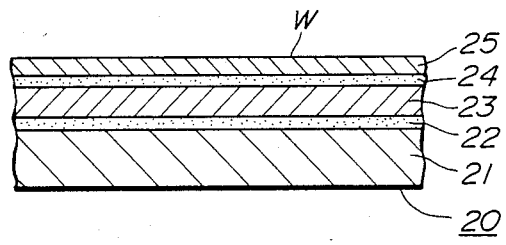
FIG. 10 to 13 are cross-sectional views of the electrostatic recording media of other embodiments according to the present invention.

FIG. 10 shows an electrostatic recording medium 20 in a second preferred embodiment of the blackboard sheet.

In the electrostatic recording medium 20, the substrate 21 is composed of a sheet of polyethylene terephthalate having a thickness of about 100 microns. An electrically conductive layer having a thickness of about 50 microns is composed of a polymer such as a polyurethane adhered to the base 21 by means of an adhesive layer 22 having a thickness of about 10 microns. The polymer constituting the conductive layer 13 contains titanium dioxide or indium oxide and is electrically conductive. The polymer has a white color. The polymer may be derived from a mixture of a diisocyanate and polyethylene glycol.

A dielectric layer 25 having a thickness of about 25 microns and made of a transparent polyvinylidene fluoride is adhered to the conductive layer 22 by means of an adhesive layer 24 having a thickness of about 10 microns. An ultraviolet absorber is contained in the adhesive layer 24. It is noted that the polyvinylidene fluoride is a substance which can not be made adherent by means of regular adhesives so that a special pressure sensitive adhesive is used. The surface of the dielectric layer 25 is used as the write surface W. In this case, since the titanium oxide or indium oxide is contained in the conductive layer 23 and the recording medium 20 is white, the dielectric layer 25 can be transparent. The preferred manuscript state of the dielectric layer 25 is maintained since the dielectricity and volume resistance value are not changed due to incident light. Since the conductive layer 23 is made of polymer such as a polyurethane in which the titanium oxide or indium oxide is contained, it is easy to make the surface resistance value relatively high, for example, $10^4$ to $10^8$ ohms per square. In addition, since the conductive layer 23 is fixed to the base 21 by means of the adhesive, the conductive layer can not be peeled off. Since the base 21 uses a less stretchable polyethylene terephthalate, the durability of the electrostaic recording medium 20 is high. Furthermore, since the pressure sensitive adhesive used to bond the transparent dielectric layer 25 to the white conductive layer 23 contains an ultraviolet absorber, the white color of the conductive layer 23 does not change with age due to ultraviolet light.

Figure 11:
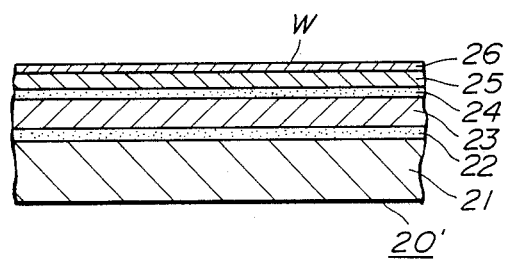

As shown in FIG. 11, a hard coat layer 26 is applied to the surface of the dielectric layer 25 as the electrostatic recording medium 20' and the surface of the hard coat layer 26 may be used as the write surface W. As the hard coat, a commercial product known as "Tough Top" marketed by the Toray Corporation and made of a resin of the polysiloxane type can be used. Consequently, damage to the surface of the write surface W can be prevented and the letters or the like written on the write surface can easily be erased.

Figure 12:
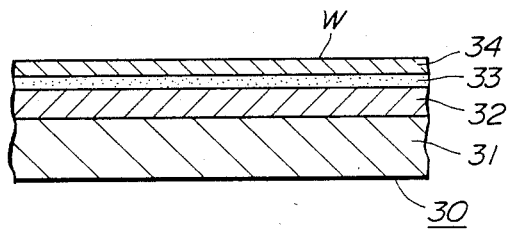

Alternatively, the conductive layer may be transparent and the base may be white. That is to say, as shown in FIG. 12, the base 31 may be constituted by white polyethylene terephthalate and an indium-tin-oxide (ITO) film of a transparent electrode on the base 31 may be formed as the conductive layer 31 through vapor deposition. The dielectric layer 34 constituted by the transparent polyvinylidene fluoride is adhered on to the conductive layer 32 by means of a pressure sensitive adhesive layer 33. The surface of the dielectric layer 34 may serve as the write surface W. The ITO film conductive layer 32 may be formed on the lower surface of the dielectric layer 34.

In this way, the characteristics of the dielectric layer 34 and the conductive layer 32 become improved and the write function of the manuscript can be readily carried out.

Figure 13:
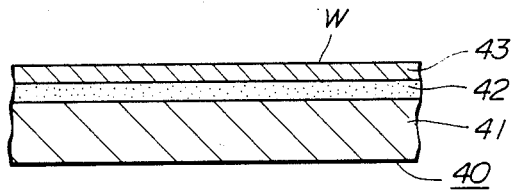

As shown in FIG. 13, a white conductive paint 42 may be applied on the base 41 of polyethylene terephthalate to form the conductive layer and the dielectric layer 43 made of transparent polyvinylidene fluoride may be formed on the conductive paint 42.

Since polyvinylidene fluoride becomes unstable when white pigments are mixed in, the white pigments or white color components should not be included in the dielectric layer but in the other layers such as the conductive layer or the base layer.

It should be noted that a pressure sensitive toner on the medium is preferably used with the electrostatic recording medium constructed as described above. Cleaning blades may be installed in pairs to achieve perfect erasure. In addition, a cleaning brush may be used with the cleaning blade to erase finger marks on the medium. Furthermore, such erasure means can be selectively separable from the electrostatic recording medium as necessary so as to prevent erasure.

The present invention thus provides an electrostatic recording medium which has a white conductive layer or white base and a dielectric layer which is transparent, the dielectric layer having particularly good characteristics for recording.

It should be evident that various modifications can be made to the described embodiments without departing from the scope of the present invention.

We claim as our invention:

1. A flexible electrostatic recording medium capable of forming latent electrostatic images by the action of an electrotatic recording head thereon comprising:
   a flexible base layer composed of a synthetic resin,
   a flexible, electrically conductive layer formed on said base layer, and
   a flexible dielectric layer composed of polyvinylidene fluoride formed on said conductive layer.

2. A recording medium according to claim 1 wherein said conductive layer is composed of a synthetic resin having conductive materials contained therein.

3. A recording medium according to claim 1 wherein said conductive layer includes write pigment particles.

4. A recording medium according to claim 1 wherein said base layer includes white pigment particles.

5. A recording medium according to claim 2 wherein the synthetic resin of said conductive layer is a polyurethane resin.

6. A recording medium according to claim 5 wherein said base layer is composed of polyvinyl chloride.

7. A recording medium according to claim 5 wherein said base layer is composed of polyethylene terephthalate.

8. A recording medium according to claim 2 wherein said conductive materials are composed of zinc oxide.

9. A recording medium according to claim 2 wherein said conductive materials are composed of titanium oxide.

10. A recording medium according to claim 2 wherein said conductive layer is adhered to said base layer by a pressure sensitive adhesive.

11. A display apparatus comprising:
a frame,
sheet guides supported by said frame,
a flexible sheet supported for movement by said sheet guides,
a recording head arranged to contact a surface of said flexible sheet,
a developing device for rendering visible a latent image formed on said flexible sheet by said recording head,
said flexible sheet comprising a base layer of synthetic material, an electrically conductive layer formed on said base layer and a dielectric layer composed of polyvinylidene fluoride formed on said conductive layer.

12. A display apparatus according to claim 11 wherein said conductive layer includes a white pigment.

13. A display apparatus according to claim 11 wherein said base layer includes a white pigment.

14. An electronic blackboard having document display functions comprising:
a first image reader for reading a document image and generating document image signals therefrom,
a flexible blackboard sheet movable past said first image reader, said blackboard sheet comprising a base layer of synthetic resin, an electrically conductive layer formed on said base layer and a dielectric layer composed of polyvinylidene fluoride formed on said conductive layer,
a second image reader for reading a blackboard image written on a surface of said blackboard sheet and generating blackboard image signals therefrom,
a recording head for recording an electrostatic latent image on said surface of said blackboard sheet in response to said document image signals,
a developing device for forming a visible image from said latent image on the surface of the blackboard sheet, and
a printing device for making printed copies of said blackboard image signals.

15. An electronic blackboard according to claim 14 wherein:
said conductive layer is composed of a synthetic resin having conductive materials absorbed therein, and wherein said dielectric layer is composed of a thin transparent film of polyvinylidene fluoride adhered to said conductive layer.

16. An electronic blackboard according to claim 14 wherein said conductive layer contains a white pigment.

17. An electronic blackboard according to claim 14 wherein said base layer contains a white pigment.

* * * * *